(12) United States Patent
Lang

(10) Patent No.: US 6,478,331 B1
(45) Date of Patent: Nov. 12, 2002

(54) GAS BAG FOR A VEHICLE OCCUPANT RESTRAINT SYSTEM

(75) Inventor: Norbert Lang, Leinzell (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/383,564

(22) Filed: Aug. 25, 1999

(30) Foreign Application Priority Data

Sep. 1, 1999 (DE) .......................................... 298 15 706

(51) Int. Cl.[7] .............................................. B60R 21/28
(52) U.S. Cl. ...................... 280/740; 280/729; 280/743.1
(58) Field of Search ................................ 280/729, 740, 280/743.1, 743.2

(56) References Cited

U.S. PATENT DOCUMENTS

| | | | | |
|---|---|---|---|---|
| 5,240,283 A | * | 8/1993 | Kishi et al. | 280/729 |
| 5,249,824 A | * | 10/1993 | Swann et al. | 280/729 |
| 5,492,362 A | * | 2/1996 | Lehman et al. | 280/739 |
| 5,516,146 A | * | 5/1996 | Kopitzke | 280/728.2 |
| 5,570,899 A | * | 11/1996 | Matsuo | 280/728.2 |
| 5,573,270 A | * | 11/1996 | Sogi et al. | 280/740 |
| 5,669,632 A | * | 9/1997 | Johnson et al. | 280/743.2 |
| 5,884,574 A | * | 3/1999 | Sogi et al. | 112/441 |
| 5,957,485 A | * | 9/1999 | Hirai | 280/729 |
| 6,022,046 A | * | 2/2000 | Isomura et al. | 280/743.2 |
| 6,086,092 A | * | 7/2000 | Hill | 280/729 |

FOREIGN PATENT DOCUMENTS

| | | |
|---|---|---|
| DE | 9211421 | 3/1993 |
| DE | 4142326 | 6/1993 |
| DE | 4442118 | 6/1995 |
| DE | 4430412 | 10/1995 |
| JP | 01132444 A | * 5/1989 |
| JP | 01311930 A | * 12/1989 |
| JP | 05262195 A | * 10/1993 |

* cited by examiner

*Primary Examiner*—Kevin Hurley
*Assistant Examiner*—Paul Royal, Jr.
(74) *Attorney, Agent, or Firm*—Tarolli, Sundheim, Covell, Tummino & Szabo L.L.P.

(57) ABSTRACT

A gas bag for a vehicle occupant restraint system includes a wall, an inflation port configured therein, a deflection part arranged between the inflation port and a portion of the gas bag wall arranged opposite the inflation port, and a counterpiece which is arranged between the deflection part on the one hand and the inflation port as well as a portion of the gas bag wall surrounding the inflation port on the other hand. The deflection part and the counterpiece are stitched to each other such that a prechamber is formed which communicates with the interior of the gas bag by overflow ports formed between the deflection part and the counterpiece.

7 Claims, 4 Drawing Sheets

GAS BAG FOR A VEHICLE OCCUPANT RESTRAINT SYSTEM

The invention relates to a gas bag for a vehicle occupant restraint system.

BACKGROUND OF THE INVENTION

A gas bag for a vehicle occupant restraint system comprises a wall, an inflation port configured therein and a deflection part arranged between the latter and the wall section opposite the inflation port.

One such gas bag is known from U.S. Pat. No. 5,573,270. The deflection part serves to deflect the hot flow of gas entering the interior of the gas bag through the inflation port so that this flow does not directly impinge the wall section opposite the inflation port, and thus not causing damage thereto. It has furthermore been discovered that deflecting the inflow of compressed gas is of advantage for the direction of deployment of the gas bag.

BRIEF DESCRIPTION OF THE INVENTION

The invention provides a gas bag permitting a specifically defined deflection and control of the inflow direction of the compressed gas into the gas bag. In accordance with the invention a gas bag for a vehicle occupant restraint system comprises a wall, an inflation port configured therein, a deflection part arranged between the inflation port and a portion of the gas bag wall arranged opposite the inflation port, and a counterpiece which is arranged between the deflection part on the one hand and the inflation port as well as a portion of the gas bag wall surrounding the inflation port on the other hand. The deflection part and the counterpiece are stitched to each other such that a prechamber is formed which communicates with the interior of the gas bag by overflow ports formed between the deflection part and the counterpiece. By means of the arrangement of the overflow ports the direction in which the compressed gas flows into the gas bag may be influenced so that the risk of the vehicle occupant being severely hit by the gas bag wall is reduced, especially when the vehicle occupant is not positioned as usual.

Advantage aspects of the invention read from the subclaims.

BRIEF DESCRIPTION OF THE DRAWINGS

The invention will now be described with reference to a preferred embodiment as illustrated in the accompanying drawings in which.

DETAILED DESCRIPTION OF THE INVENTION

Figure 1:
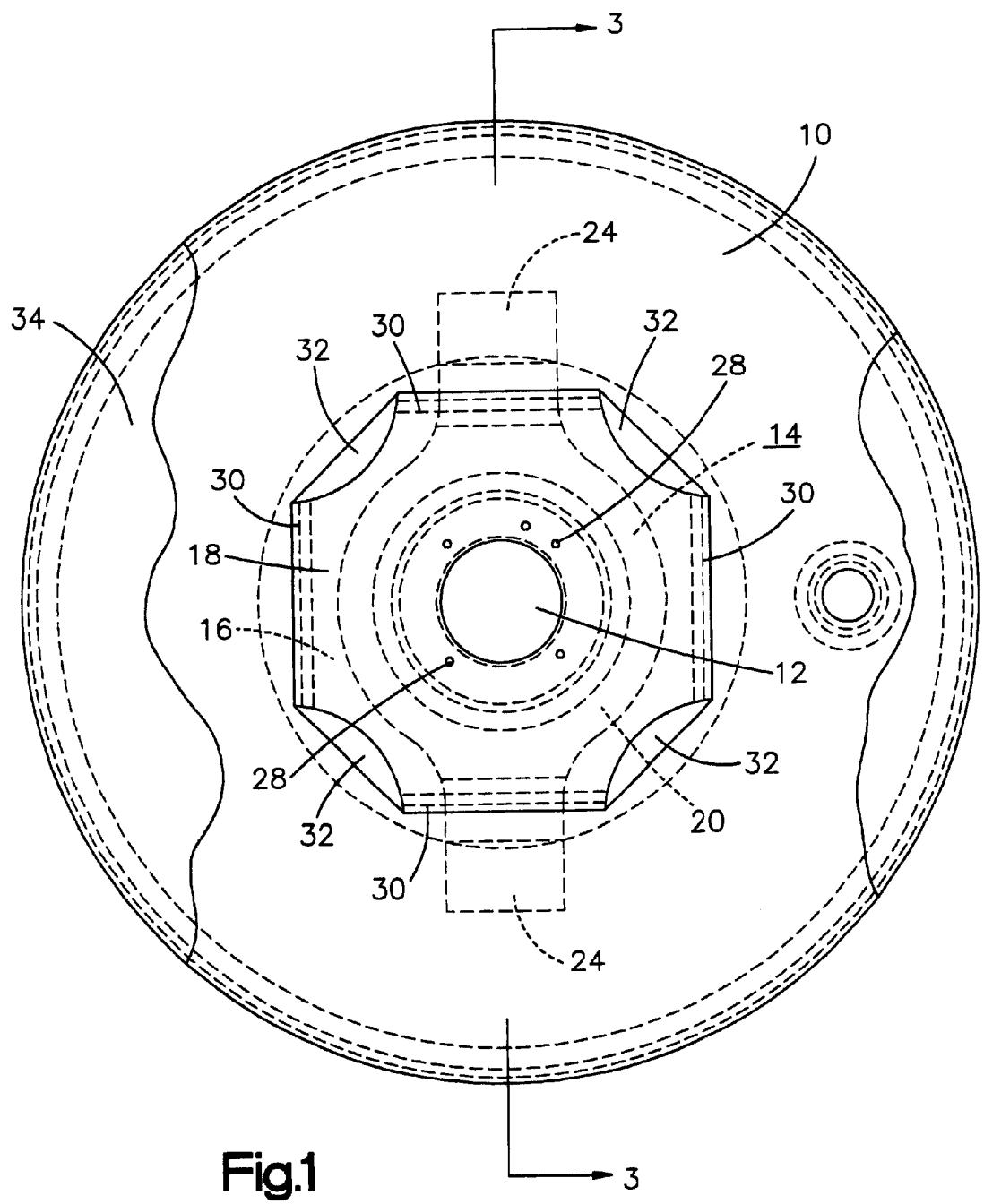
FIG. 1 is a schematic plan view of a gas bag in accordance with the invention wherein part of the wall of the gas bag is not illustrated.

Referring now to FIG. 1 there is illustrated schematically a gas bag in accordance with the invention consisting of two fabric parts or outer walls stitched to each other. For a better overview the fabric part or outer wall 34 usually facing the vehicle occupant to be restrained is partially shown so that a lower part or outer wall 10 is evident, provided with an inflation port 12. The fabric part or outer wall 34 usually facing the vehicle occupant is located opposite the inflation port 12.

Figure 4:
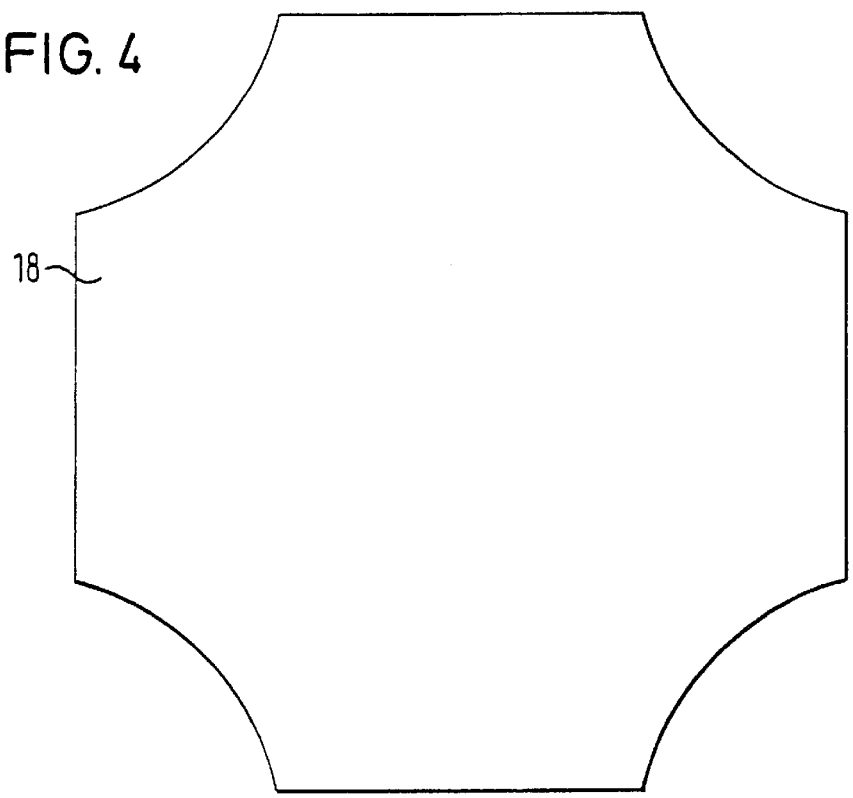
FIG. 4 is a plan view of a deflection part as used in the gas bag as shown in FIG. 1.
Figure 5:
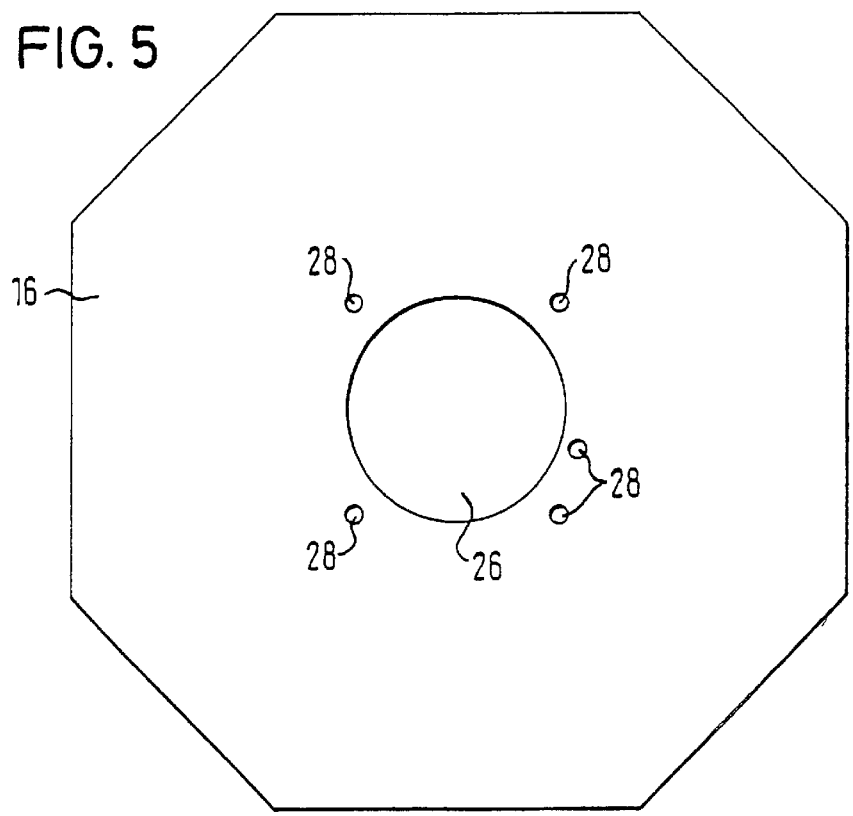
FIG. 5 is a plan view of a counterpiece as used in the gas bag as shown in FIG. 1.

Arranged in the interior of the gas bag is a deflection part 18 (see FIG. 4) and a counterpiece 16 (see FIG. 5). Both the deflection part 18 and the counterpiece 16 have an octagonal shape, the counterpiece 16 being provided with eight straight edge sections, whilst the deflection part 18 has four straight edge sections and four curved edge sections. The deflection part 18 and the counterpiece 16 are stitched along the straight edge sections of the deflection part 18 by means of four seam sections 30. In this way a closed prechamber is formed, provided with four overflow ports 32 disposed between the seam sections 30.

Configured in the counterpiece 16 is a center port 26. This is fixed in place by means of a retaining ring (not shown) arranged in the interior of the prechamber so that it coincides with the inflation port. The retaining ring is provided with fastener studs which pass through openings 28 in the wall section of the gas bag surrounding the inflation port 12 as well as in the counterpiece 16 for fixing the prechamber to the wall of the gas bag.

Figure 2:
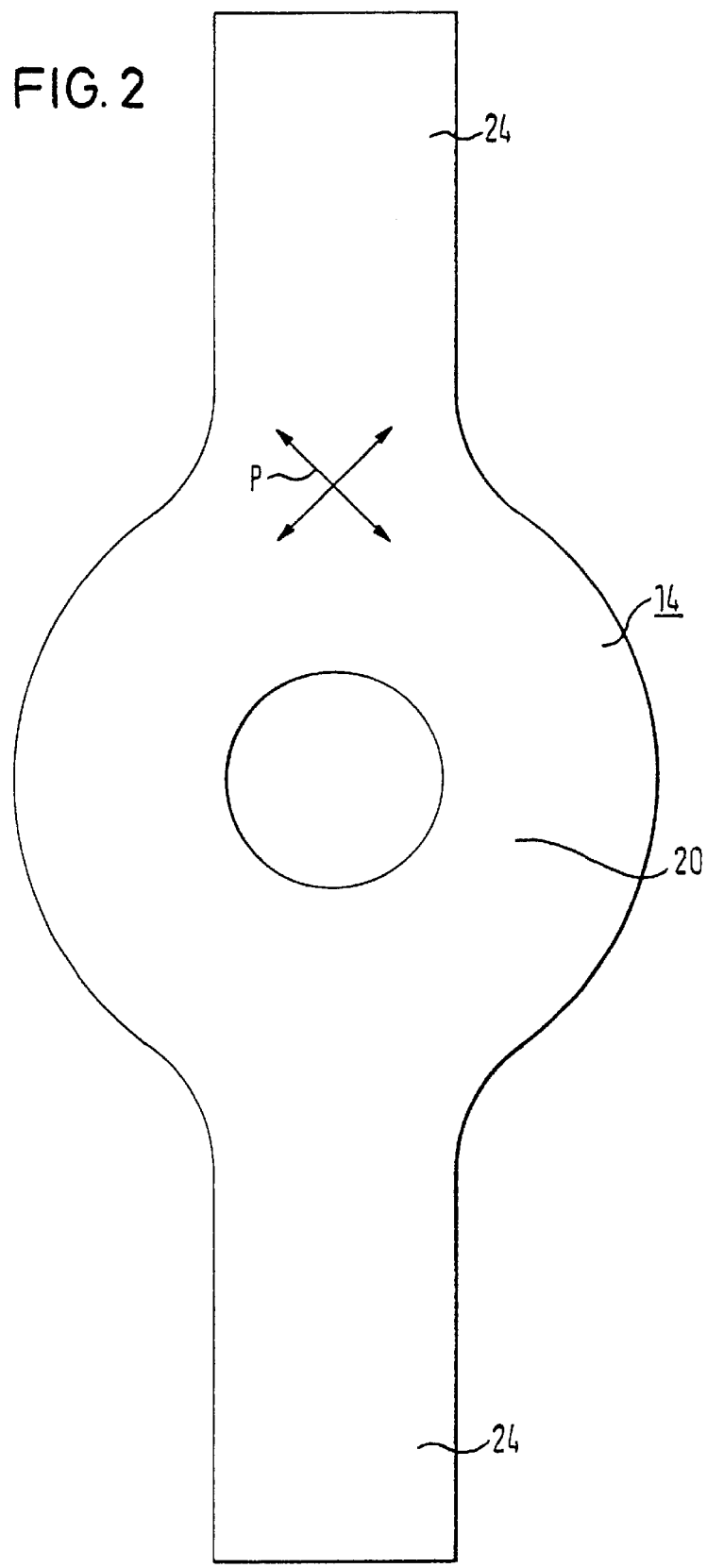
FIG. 2 is a plan view of a catch strap used on the gas bag as shown in FIG. 1.
Figure 3:
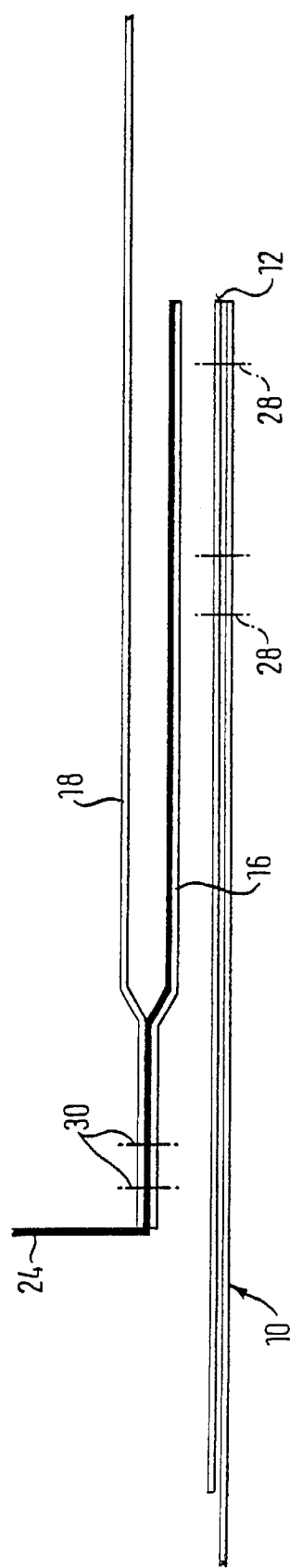
FIG. 3 is a section taken along the plane III—III as shown in FIG. 1.

For stabilizing the gas bag in the deployed condition a catch strap 14 is provided (see FIG. 2) comprising a middle section 20 and two fastener strips 24 extending from the latter. The warp and weft directions of the fabric of the catch strap are symbolized by the arrows identified P.

The middle section of the catch strap is stitched to the section 34 of the gas bag wall opposite the inflation port 12, i.e. to the wall section facing the vehicle occupant to be restrained. The two fastener strips 24 of the catch strap 14 are stitched between the counterpiece 16 and the deflection part 18 by means of two of the seam sections 30 to the wall of the prechamber.

On an inflow of compressed gas through the inflation port into the gas bag the compressed gas first flows into the prechamber between the deflection part 18 and the counterpiece 16. From this prechamber it then flows through the overflow ports 32 into the interior of the gas bag, it being this thus assured substantially radial direction of inflow that results in a particularly favorable deployment of the gas bag.

What is claimed is:

1. A gas bag having a deflated condition and an inflated condition and for use in a vehicle occupant restraint system, said gas bag comprising:

first and second outer walls stitched to each other and defining an interior of the gas bag which interior receives gas to inflate the gas bag;

said first wall defining an inflation port opening, said second wall being opposite said inflation port opening;

a deflection part covering said inflation port opening and having an edge section, said deflection part being located in said interior of the gas bag and spaced apart from said first and second walls when the gas bag is inflated;

a counterpiece located in said interior of the gas bag having an edge section stitched to said edge section of said deflection part and located between said deflection part and said first wall, said counterpiece being connected with said first wall;

said stitched together deflection part and said counterpiece together defining a prechamber which communicates with said inflation port and receives gas to inflate the gas bag from the inflation port, said deflection part and said counterpiece defining overflow ports for directing gas from said prechamber into a volume between said first and second walls to inflate the gas bag, said prechamber, defined by said stitched together deflection part and said counterpiece, upon inflation of the gas bag, being located spaced apart from said second wall, said deflection part and said counterpiece being stitched to each other by individual seam sections, said overflow ports being formed between said individual seam sections.

2. The gas bag of claim 1, wherein said deflection part and said counterpiece each have an octagonal shape with eight edge sections, four of said edge sections being straight and said seam sections being provided at said straight edge sections.

3. The gas bag of claim 1, wherein at least one catch strap having a middle section is provided, said middle section being stitched to said second wall of said gas bag opposite said inflation port.

4. The gas bag of claim 3, wherein said catch strap comprises two fastener strips stitched to said deflection part.

5. The gas bag of claim 3, wherein said catch strap comprises two fastener strips stitched to said counterpiece.

6. The gas bag of claim 4, wherein said fastener strips of said catch strap are stitched into place by two opposing seam sections.

7. The gas bag of claim 5, wherein said fastener strips of said catch strap are stitched into place by two opposing seam sections.

* * * * *